United States Patent [19]
Caveney

[11] 3,929,432
[45] Dec. 30, 1975

[54] DIAMOND PARTICLE HAVING A COMPOSITE COATING OF TITANIUM AND A METAL LAYER

[75] Inventor: Robert John Caveney, Johannesburg, South Africa

[73] Assignee: De Beers Industrial Diamond Division Limited, Johannesburg, South Africa

[22] Filed: Sept. 18, 1973

[21] Appl. No.: 398,383

Related U.S. Application Data

[63] Continuation-in-part of Ser. No. 146,831, May 25, 1971, abandoned.

[30] Foreign Application Priority Data
May 29, 1970  South Africa...................... 70/3653

[52] U.S. Cl................................... 51/295; 51/309
[51] Int. Cl.² ........................ B24D 3/06; C09C 1/68
[58] Field of Search............................. 51/295, 309

[56] References Cited
UNITED STATES PATENTS

| | | | |
|---|---|---|---|
| 3,293,012 | 12/1966 | Smiley | 51/295 |
| 3,356,473 | 12/1967 | Hull et al. | 51/295 |
| 3,528,788 | 9/1970 | Seal | 51/295 |
| 3,650,714 | 3/1972 | Farkas | 51/309 |
| 3,663,191 | 5/1972 | Kroder | 51/309 |
| 3,841,852 | 10/1974 | Wilder et al. | 51/295 |
| 3,871,840 | 3/1975 | Wilder et al. | 51/295 |
| 3,879,901 | 4/1975 | Caveney | 51/295 |

FOREIGN PATENTS OR APPLICATIONS

| | | | |
|---|---|---|---|
| 1,154,598 | 6/1969 | United Kingdom | 51/295 |
| 712,057 | 7/1954 | United Kingdom | 51/309 |

*Primary Examiner*—Donald J. Arnold
*Attorney, Agent, or Firm*—Young & Thompson

[57] ABSTRACT

A diamond particle of the MD or the SD type having a composite coating comprising a thin continuous layer of titanium adjacent the diamond surface and a metal layer on the titanium layer, the metal of the metal layer being capable of forming an alloy with titanium under the influence of heat and the titanium/diamond interface being essentially free of chemical bond formation. The invention further provides a method of making a metal bonded abrasive device which includes the steps mixing the above described particles with a suitable metal matrix, heating the mixture to a temperature exceeding 500°C, maintaining the mixture at the elevated temperature for a period of from 10 to 30 minutes, and allowing the mixture to return to ambient conditions.

11 Claims, 1 Drawing Figure

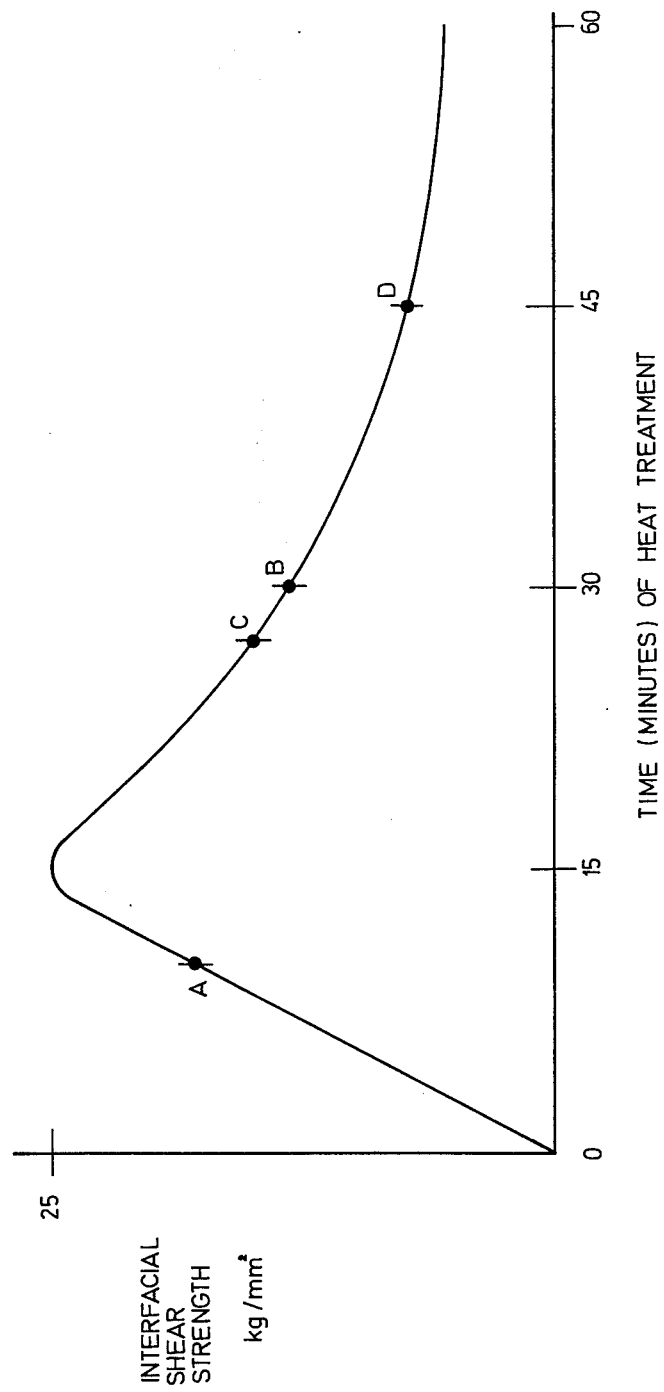

DIAMOND PARTICLE HAVING A COMPOSITE COATING OF TITANIUM AND A METAL LAYER

CROSS REFERENCE TO RELATED APPLICATION

This application is a continuation-in-part of my co-pending application Ser. No. 146,831 filed May 25, 1971 and now abandoned. This invention relates to the coating of diamonds.

Three principal types of diamond particles are currently being used in the abrading surfaces of abrasive tools such as saws and grinding wheels. The first type is known as resin bond diamond (RD), the second type is known as metal bond diamond (MD) and the third type is known as saw diamond (SD). All three types of diamond particle may be obtained from natural sources or they may be produced synthetically. The RD type of particle is used in abrasive tools having a bonding matrix of resinous material such as phenol-formaldehyde resins, while the MD and SD diamond particles are used in abrasive tools using a metal such as bronze as the bonding matrix.

MD and SD diamond particles have a higher impact resistance than RD particles which tend to be friable. The MD and SD particles generally present a blocky crystal, although irregular shaped particles of this type are known. RD particles on the other hand, are of an irregular shape and tend to fracture during grinding operations. An important feature of MD and SD diamond particles is that, due to their higher impact strength, fracture during grinding or sawing operations is minimised and wear occurs largely by abrasion processes. For practical purposes SD and MD diamond particles have the same characteristics and properties.

A problem associated with MD and SD diamond particles is that it has not been possible in the past to provide a metal coating for the particles which adheres sufficiently well to the diamond surface under the abrading conditions encountered, hence resulting in premature dislodgement of the diamond particle from the metal matrix.

It is an object of the present invention to provide a novel coated diamond particle of the MD or SD type which when incorporated in metal bond wheels or saws impart to those wheels and saws improved properties under abrading conditions.

According to the invention, there is provided a diamond particle of the MD or SD type having a composite coating comprising a thin continuous layer of titanium adjacent the diamond surface and a metal layer on the titanium layer, the metal of the metal layer being capable of forming an alloy with titanium under the influence of heat and the interface between the diamond and the titanium being essentially free of chemical bond formation.

The thin layer of titanium must be such as to provide a continuous layer around the diamond particle. The actual amount of titanium in the layer will vary according to the size of particle, but will, in general, be less than 3 percent by weight of the uncoated diamond. The titanium may be applied to the diamond particle by methods well known in the art, particularly by vacuum deposition. The Applicant has found that the method of vacuum deposition described in "Vacuum Deposition of Thin Films" by L. Holland, Chapman and Hall, 1st Edition 1956, provides particularly suitable titanium films.

The metal of the metal layer must be capable of forming alloys with titanium under the influence of heat. Examples of such metals are iron, nickel, cobalt, copper, and alloys thereof, e.g. iron-nickel alloys.

The metal layer may be applied to the titanium coated diamond by methods known to the art. Suitable methods of application are electroplating, electroless plating, and vacuum deposition. An example of a suitable method of electrolessly plating nickel or cobalt on to diamonds is disclosed in U.K. Patent Specification No. 1198479. An example of a suitable method of electroplating metals is disclosed in "Electroplating Engineering Handbook" by H.K. Graham, 1955, Rheinhold; and a suitable method of electroplating alloys is disclosed in "Electrodeposition of Alloys Principles and Practice" Volume II, Abner Brenner, Academic Press N.Y. and London, pages 265–314.

Nickel is the preferred metal for the metal layer. The nickel is preferably electroplated on to the Ti-coated diamond using nickel sulphamate as a source of nickel ions. A description of the method of electroplating nickel on to diamonds using nickel sulphamate as a source of nickel ions can be found in U.K. Patent Specification No. 1,304,964.

The metal of the metal layer is preferably present in an amount of from 10 to 100 percent by weight of the uncoated diamond.

The invention provides, according to another aspect, a method of manufacturing a metal bonded abrasive device including the steps of:

a. forming an effective mixture of a suitable metal matrix material and diamond particles;
b. heating the mixture to a temperature exceeding 500°C;
c. maintaining the mixture at a temperature exceeding 500°C for a period of from 10 to 30 minutes; and
d. allowing the mixture to return to ambient conditions.

The mixture is preferably maintained at the elevated temperature for a period of from 10 to 20 minutes.

Heating the mixture to temperatures exceeding 500°C results in the simultaneous formation of an alloy between the metal of the metal layer and the titanium and the formation of a titanium carbide chemical bond at the titanium/diamond interface. The formation of the chemical bond at the titanium/diamond interface during the manufacture of the metal bonded abrasive device, i.e. either saw segment or metal bond wheel, is an important feature of the invention. It is essential that this chemical bond is formed during device manufacture and not prior to this manufacture. The significance of this will now be explained.

It has been found experimentally that the titanium/diamond interfacial bond or shear strength is a function of the period of heat treatment, with peak strength occurring after about 10 to 15 minutes of heat treatment. FIG. 1 illustrates a graph of interfacial shear strength for the titanium/diamond bond as a function of period of heat treatment.

The various points for the curve illustrated by FIG. 1 were obtained by coating diamond plaques with a titanium layer, heat treating the layer to a temperature of the order of 700°C for a particular period and then measuring the interfacial shear strength of the titanium/diamond interface using a Hounsfield tensometer. As is indicated by FIG. 1 a maximum shear strength of about 25 kg/mm$^2$ was achieved. This peak occurred with heat treatment of the order of 10 to 15 minutes.

Relating this information to the present case, if the titanium coated diamond particles have no carbide formation prior to device manufacture, then after heat treatment at 700°C for 10 to 30 minutes, which is encountered during device manufacture, the interfacial shear strength of the diamond/titanium interface will straddle the peak strength, i.e it will lie in the region marked A to B in FIG. 1. If, on the otherhand, there is prior heat treatment of say 15 minutes in order to produce a titanium carbide interface then after device manufacture involving heat treatment for a period of 10 to 30 minutes, the interfacial shear strength of the titanium/diamond interface will be considerably lower, i.e. it will lie in the region marked C to D in FIG. 1. In other words the advantage of carbide bonding at the diamond/titanium interface will largely be lost.

The matrix material is preferably such as to alloy with the metal of the metal layer so that when the mixture containing the coated diamonds is heated to a temperature of greater than 500°C alloy formation between the metal layer and the matrix material occurs.

The metal bonded abrasive device may be a segment for attachment to a saw or a metal bond grinding wheel. In the latter case the diamonds are located on the peripheral grinding region of the wheel.

The temperature to which the mixture containing the diamonds is heated depends largely on the type of matrix used, although in all cases it is important to heat treat to a temperature greater than 500°C to ensure that the Ti-C bond is formed. When bronze is used as a matrix material the temperature of heat treatment is preferably between 700° and 850°C, particularly about 720°C.

The methods used for making saw segments and metal bond wheels using the coated diamonds of the invention may be those of the prior art, save that in all cases the matrix including the coated diamonds must be heated to a temperature of greater than 500°C and maintained at this elevated temperature for a period of from 10 to 30 minutes. Examples of methods of manufacturing saw segments, saws and metal bond wheels used by the Applicant are given below.

METHOD OF MANUFACTURE OF A SAW SEGMENT AND SAW

SD diamond particles are mixed with a matrix metal and 10% by weight of a 100/120 U.S. Mesh Harmet Chip such that the diamond concentration is 35.4, i.e. about 25 carats of diamond per cubic inch. The mixture is placed in a suitable mold and cold pressed at a pressure of 10 tons per square inch. This step is then followed by a hot pressing step at a pressure of 10 tons per square inch and a temperature determined by the matrix metal used, but greater than 500°C. In the case of an 80/20 bronze matrix (which is preferred) the optimum temperature is 720°C. On the otherhand for matrices such as cobalt temperatures as high as 1400°C may be employed. The hot pressing, as discussed above, is maintained for a period of from 10 to 30 minutes.

The pressed metal is then removed from the mold and provides a segment for a saw. These segments are brazed on to a saw body to provide the saw. The applicant's saws generally contain 24 segments.

It is to be noted that compaction or pressing of the mixture produces intimate contact between the coated particles and the matrix material. Compaction may take place before or during heat treatment. In the case of a matrix material which melts under the conditions of heat treatment, no compaction may be required.

METHOD OF MANUFACTURE OF METAL BOND WHEELS

This method is essentially the same as that for saw manufacture except that no segments are manufactured, but a continuous peripheral region of the wheel containing diamonds is prepared.

The wheel hub is usually made of the same matrix metal as the peripheral region. A suitable mold is filled with the hub metal, the peripheral region for the wheel being occupied by a blank to prevent the hub metal flowing into this region. The metal is then cold pressed in a similar manner to the saw case mentioned above. After the cold compaction, the mold is opened, the blank removed, and a mixture of diamond particles and matrix metal, usually a concentration of 100, i.e. 72 carats per cubic inch, is then poured into the peripheral region of the mold. The whole is cold pressed and then subjected to a hot pressing as described for saws.

EXAMPLE I

In a first example of the invention, SD diamond particles were coated with a composite coating comprising an inner thin, continuous layer of titanium and an outer metal layer. The titanium layer was applied to the coating using the vacuum deposition method described in the above identified "Vacuum Deposition of Thin Films". The nickel layer was applied to the coated particles by electroplating using nickel sulphamate as a source of nickel ions.

The following plating solution for the nickel plating was used:

| | | |
|---|---|---|
| Ni Sulphamate concentrate | 500 ml/l | |
| NiCl$_2$. 6H$_2$O | 16.4 | g/l |
| H$_3$BO$_3$ | 30 | g/l |
| SN$_1$ (Stress releasing agent) | 7.5 | g/l-(Optional) |

Ni Sulphamate concentrate is a commercially available solution containing 900 g/l of Ni Sulphamate (SN$_1$ is a product of the M and T Chemicals Corp, Rahway, N.J. U.S.A.).

The nickel chloride, boric acid and SN$_1$ were dissolved separately in hot demineralised water and added to the sulphamate concentrate. The whole was then filtered to provide the plating solution.

A standard rotary plating vessel having a 2½ inch by 1 inch nickel anode, was used.

The pH of the prepared plating solution was 3 to 5 which was suitable for plating purposes. It was not found necessary to adjust the pH during the plating as it remained within the above range.

The solution was heated to 80° to 90°C prior to commencing plating and the current density used was 5 to 10 amps per 1000 carats of diamond.

The plating rate obtained was 3 to 5 percent on the diamond weight per hour.

A bright dense coating was obtained of density greater than 8 gm/cc, i.e. between 8.2 and 8.5 (the theoretical value is 8.9). The nickel layer amounted to 31.95% by weight of the uncoated diamond.

EXAMPLE 2

In a second example of the invention, a Ti/Ni composite coating was applied to SD diamond particles using the same procedures as Example 1, except that the resulting particles had a nickel layer amounting to 49.64% by weight of the uncoated particle.

The coated diamonds resulting form Examples 1 and 2 were then included in metal bonded abrasive saw segments by the method described above, and the segments brazed on to a saw body. For the purposes of comparison saw segments containing coated diamonds of the prior art were brazed on to another saw body.

TEST CONDITONS

Prior to actual testing, all saw blades were dressed with red face brick to expose the amount of diamond necessary for working in granite. After this, each blade was subjected to two conditioning tests in granite to eliminate the sharp edges left over from the brick dressing. Only then were the blades put through the Laboratory test procedure.

Segmented type saw blades 16 inch diameter × ⅛ inch width with 1/5 inch depth of impregnation were used for these tests.

| TEST SPECIFICATIONS | |
|---|---|
| Machine Type: | Stationary head Cassie diamond saw |
| Spindle Power: | 20 H.P. |
| R.P.M | 1950 |
| Surface Speed: | 8164 S.F.P.M. |
| Sawing Rate: | 30.6 in²/min |
| Traverse Rate: | 78 in/min |
| Depth of each pass: | .39 in |
| Area sawn per test: | 10.2 ft² |
| Total area sawn per grit type: | 102 ft² |
| Coolant: | Water |
| Coolant Flow: | 600 G.P.H. |

The results obtained from these tests are tabulated in Table I. As can be seen from the results, the coated diamonds of the invention provide saws having greater wear resistance, i.e. a lower rate of diamond particle dislodgement from the matrix, then the saw containing prior art coated diamonds.

It was also observed that when a segment containing the coated diamonds of the invention and prepared by the method of the invention was broken, the fracture occurred across the diamond particles. This indicates that the bonds formed between the two interfaces are stronger than the diamond itself. When segments containing coated diamonds of the prior art were broken, the diamonds in the fracture surface were not fractured, but appeared as whole diamonds in the one half, leaving empty shells in the other fractured half of the segment.

TABLE 1

| COATING | PAARL GRANITE | | PARYS GRANITE | |
|---|---|---|---|---|
| | Wear/in² of material sawn | % Improvement | Wear/in² of material sawn | % Improvement |
| 40% Ni | 0.1420 mm | 0 | 0.2048 mm | 0 |
| Ti + 39.95% Ni | 0.1185 mm | 20 | 0.1944 mm | 5 |
| Ti + 49.64% Ni | 0.1352 mm | 5 | 0.2000 mm | 3 |

I claim:

1. A diamond particle of the MD or SD type having a composite coating comprising a thin continuous layer of titanium adjacent the diamond surface, the titanium being present in an effective amount less than 3% by weight of the uncoated particle, said amount being effective to provide a continuous layer around the diamond particle, and a metal layer on the titanium layer, the metal of the metal layer being selected from the group consisting of iron, nickel, cobalt, copper and alloys containing one or more of these metals and being capable of forming an alloy with titanium under the influence of heat and being present in an amount of from 10 to 100% by weight of the uncoated particle, and the interface between the diamond and the titanium being essentially free of chemical bond formation.

2. A diamond particle according to claim 1 wherein the metal of the metal layer is nickel.

3. A diamond particle of the MD or SD type having a composite coating comprising a thin continuous layer of titanium adjacent the diamond surface and a layer of nickel on the titanium layer, the interface between the diamond and the titanium being essentially free of chemical bond formation, the titanium being present in an effective amount of less than 3% by weight of the uncoated particle, said amount being effective to provide a continuous layer around the diamond particle, and the nickel being present in an amount of from 10–100% by weight of the uncoated particle.

4. A method of manufacturing a metal bonded abrasive device including the steps of:

a. forming an effective mixture of a solid metal matrix material and diamond particles of the MD or SD type having a composite coating comprising a thin continuous layer of titanium adjacent the diamond surface, the titanium being present in an effective amount less than 3% by weight of the uncoated particle, said amount being effective to provide a continuous layer around the diamond particle, and a metal layer on the titanium layer, the metal of the metal layer being selected from the group consisting of iron, nickel, cobalt, copper and alloys containing one or more of these metals and being capable of forming an alloy with titanium under the influence of heat and being present in an amount of from 10 to 100% by weight of the uncoated particle, and the interface between the diamond and the titanium being essentially free of chemical bond formation;

b. heating the mixture to a temperature exceeding 500°C;

c. maintaining the mixture at a temperature exceeding 500°C for a period of from 10 to 30 minutes; and d. allowing the mixture to return to ambient conditions.

5. A method according to claim 4 wherein the mixture is maintained at a temperature exceeding 500°C for a period of from 10 to 20 minutes.

6. A method according to claim 4 wherein the metal matrix material is capable of forming an alloy with the metal of the metal layer.

7. A method according to claim 6 wherein the metal matrix material is bronze.

8. A method according to claim 7 wherein the mixture is heated to a temperature of from 700° to 850°C in step (b).

9. A method according to claim 7 wherein the mixture is heated to a temperature of about 720°C in step (b) and maintained at this temperature during step (c).

10. A method according to claim 4 wherein the device is a segment of a saw.

11. A method according to claim 4 wherein the device is a metal bond wheel.

* * * * *